No. 645,792. Patented Mar. 20, 1900.
L. M. G. DELAUNAY-BELLEVILLE.
PUMPING APPARATUS AND COMPRESSOR.
(Application filed Mar. 3, 1898.)
(No Model.) 4 Sheets—Sheet 1.
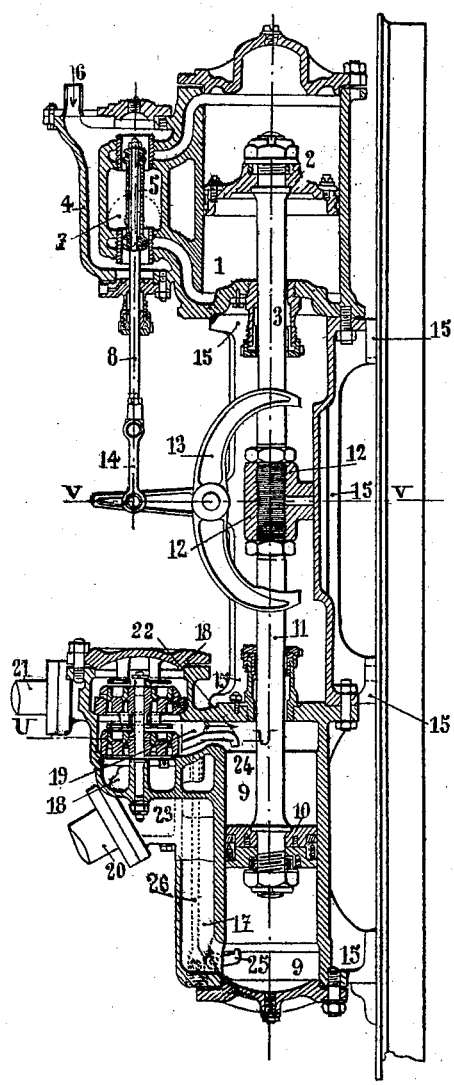
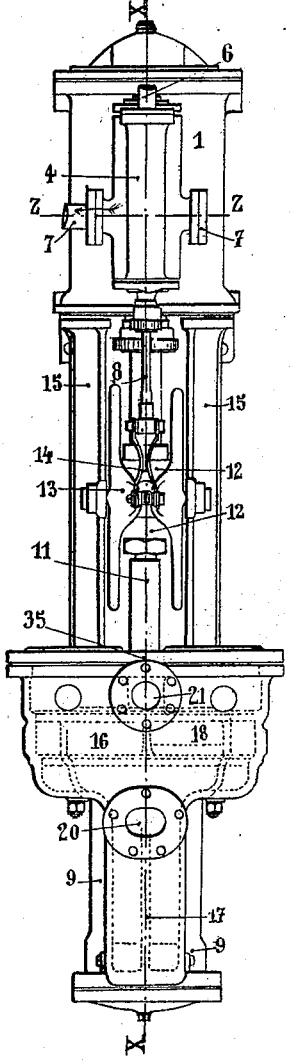
Witnesses:
Gro. W. Rea.
W. Lee Helms
Inventor:
Louis M. G. Delaunay-Belleville
By James L. Norris
Atty.

No. 645,792. Patented Mar. 20, 1900.
L. M. G. DELAUNAY-BELLEVILLE.
PUMPING APPARATUS AND COMPRESSOR.
(Application filed Mar. 3, 1898.)
(No Model.) 4 Sheets—Sheet 2.
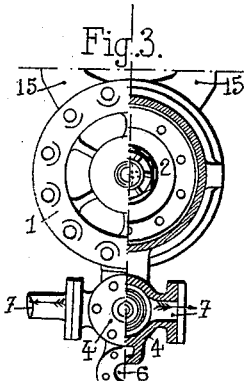
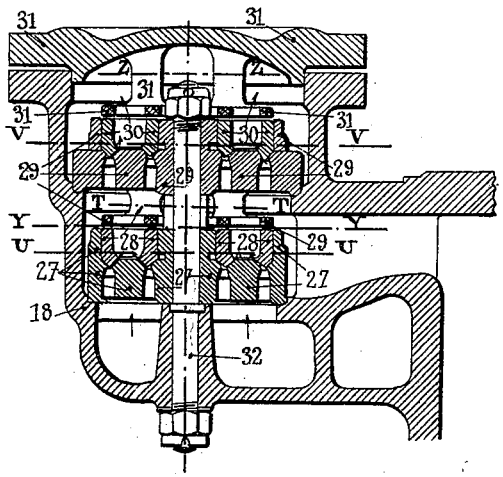
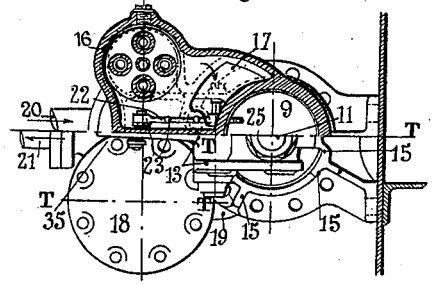
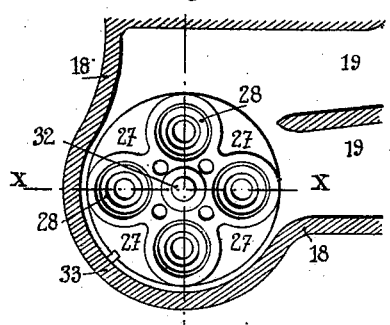
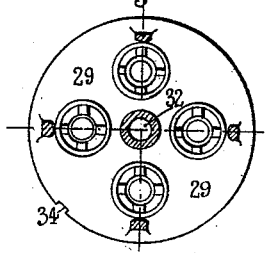
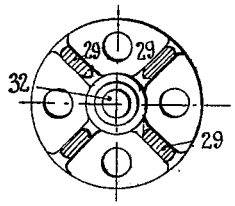 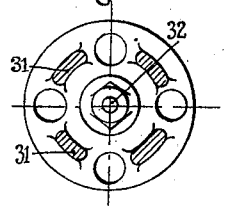
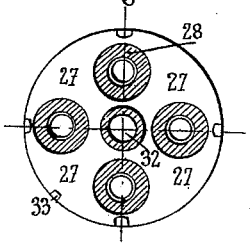
Witnesses: Inventor:
Louis M. G. Delaunay-Belleville,
By James L. Norris
Atty.

No. 645,792. Patented Mar. 20, 1900.
L. M. G. DELAUNAY-BELLEVILLE.
PUMPING APPARATUS AND COMPRESSOR.
(Application filed Mar. 3, 1898.)
(No Model.) 4 Sheets—Sheet 3.
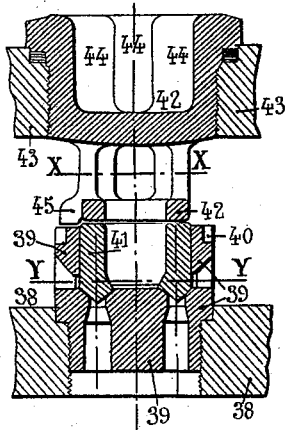
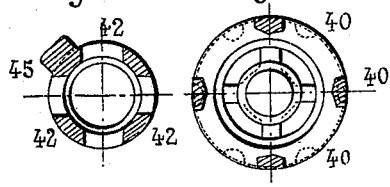
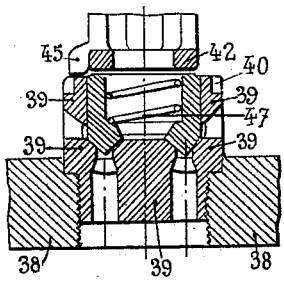
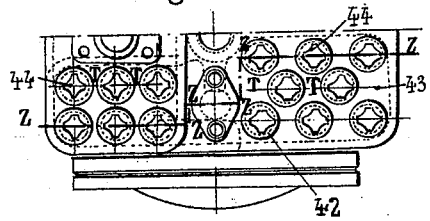
Witnesses:
Geo. W. Rea
W. Lee Helms
Inventor:
Louis M. G. Delaunay-Belleville,
By James L. Norris
Atty.

No. 645,792. Patented Mar. 20, 1900.
L. M. G. DELAUNAY-BELLEVILLE.
PUMPING APPARATUS AND COMPRESSOR.
(Application filed Mar. 3, 1898.)
(No Model.) 4 Sheets—Sheet 4.
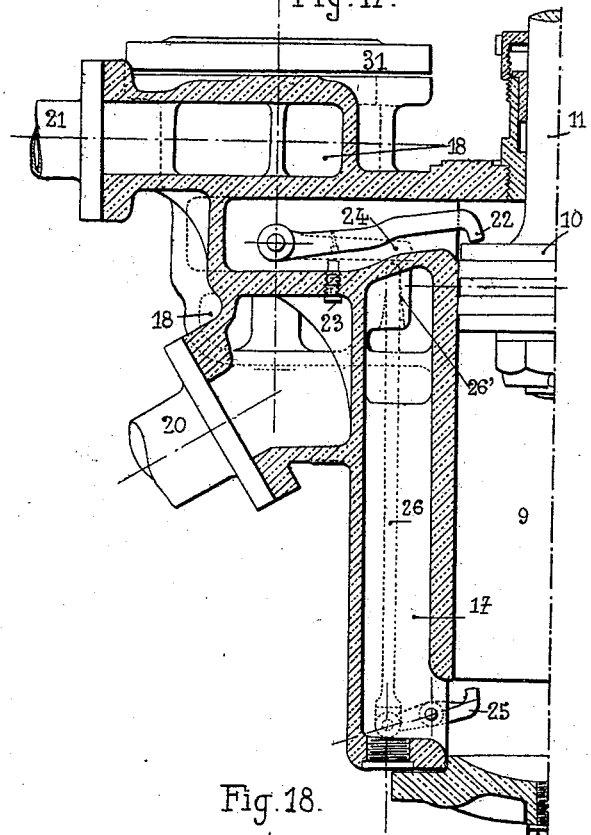
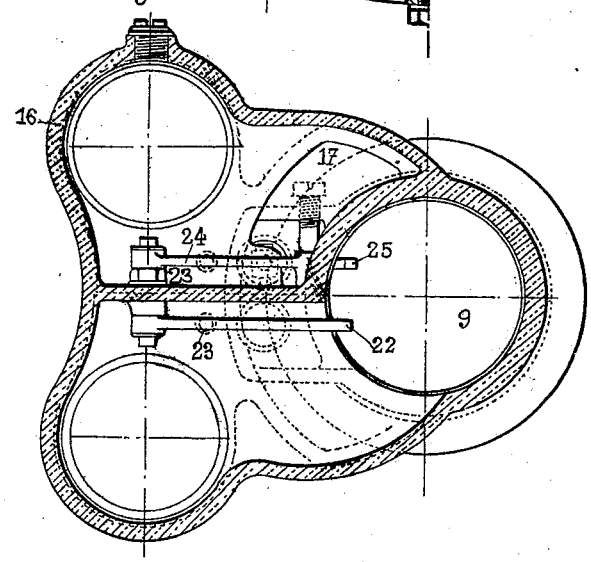
Witnesses: Inventor:

UNITED STATES PATENT OFFICE.

LOUIS MARIE GABRIEL DELAUNAY-BELLEVILLE, OF NEUILLY, FRANCE.

PUMPING APPARATUS AND COMPRESSOR.

SPECIFICATION forming part of Letters Patent No. 645,792, dated March 20, 1900.

Application filed March 3, 1898. Serial No. 672,419. (No model.)

*To all whom it may concern:*

Be it known that I, LOUIS MARIE GABRIEL DELAUNAY-BELLEVILLE, a citizen of France, residing at Neuilly, in the Department of the Seine, France, have invented certain new and useful Improvements in Pumping Apparatus and Compressors, of which the following is a specification.

This invention relates to pumping apparatus and compressors, which I will describe as applied to a pump, with reference to the accompanying drawings.

Figures 1 to 11 represent a disposition for fixing the seats of the clack-valves in groups. Fig. 1 is a longitudinal section on the line X X of Fig. 2, which is a front elevation of a vertical feed-pump constructed in accordance with my invention. The left-hand half of Fig. 3 shows the cylinder in plan, while the right-hand half represents a section on the line Z Z of Fig. 2. Fig. 4 represents a half-plan and half-section of the pump on the line U U of Fig. 1 and of the frame on the line V V of Fig. 1. Fig. 5 is a section through the axis of the clack-valve casing, the section being taken on the line X X of Fig. 6, which is a section on the line Y Y of Fig. 5. Fig. 7 is a section on the line Z Z of Fig. 5. Fig. 8 is a section on the line T T of Fig. 5. Fig. 9 is a section on the line V V of Fig. 5, the clack-valves being taken off; and Fig. 10 is a section on the line U U of Fig. 5, showing the clack-valves in place. Figs. 11 to 16 represent an example for fixing individually the seats of the externally-guided annular clack-valves, the guides forming integral parts of the seats. Fig. 11 is a cross-section on the line Z Z Z Z of Fig. 12, which is a half-plan of a pump according to my invention. Fig. 13 is a vertical section of a clack-valve and its guard, the section being taken on the lines T T T' T' of Fig. 12. Fig. 14 is a section on the line X X of Fig. 13. Fig. 15 is a section on the line Y Y of Fig. 13, with the clack-valve removed. Fig. 16 is a vertical section of a clack-valve provided with a spring. Fig. 17 is an enlarged view, in sectional elevation, through the clack-valve casing and a part of the pump-cylinder; and Fig. 18 is a sectional plan view of the same parts.

1 represents the steam-cylinder, and 2 represents its piston, which may be constructed like the piston of a motor.

3 is the piston-rod.

4 is the slide-valve casing, in which operates the cylindrical slide-valve 5, provided with interior washers and counter-washers. The steam enters at 6 and exhausts at 7, which may be at the right or left hand side, as may be most convenient.

8 is the slide-valve rod.

9 is the pump-cylinder, and 10 the piston thereof, which may be provided with segments of hardened india-rubber, with a washer between the segments. The arrangements for tightening can be similar to those employed for steam-pistons.

11 is the rod of the pump-piston.

12 is the coupling for the two piston-rods 3 and 11, this at the termination of the stroke acting as a tappet to operate the fork 13, which actuates the steam-distributing slide through the connecting-rod 14.

15 is a vertical frame, upon which the steam and pump cylinders are fixed. This frame is hollow and open at front.

The steam-cylinder 1 is fixed to the frame 15 by its bottom flange, so that it can freely expand and contract without its axis being displaced, and therefore the said cylinder will not be worn out of circular shape.

16 is the clack-valve casing communicating with the lower end of the pump-cylinder 9 by the channel 17, divided by a vertical diaphragm. 18 is the clack-valve casing communicating with the upper end of the pump-cylinder 9 by the channel 19, which is likewise divided by a diaphragm. These two clack-valve casings 16 and 18 communicate with the common suction-pipe 20 and with the discharge or rising main 21.

22 is the flap-valve for the discharge from the upper end of the pump-cylinder, this flap-valve serving to close the orifice 23, which places the suction and the discharge in communication when the piston commences to lift the upper flap-valve at the end of the stroke.

24 is the flap-valve for the discharge from the lower end of the pump-cylinder. This flap-valve serves to close the orifice 23', which also affords communication between the suction and discharge. The piston 10 actuates the lever 25 at the end of its lower stroke, which raises the flap-valve 24 by means of the connecting-rod 26, the upper end of which slides in a curved orifice 26' in a guide, as shown in Fig. 17. The suction and outlet clack-valves are represented in detail and on a larger scale in Figs. 5 to 10.

27 represents the seats and the guides of the suction clack-valves, provided with annular clacks 28 28.

29 represents the seats and the guides of the outlet clack-valves, provided with annular clacks 30 30 30.

The clacks for the suction and outlet are provided in greater or smaller number in accordance with the capacity of the pump.

31 is the cover of the clack-valve casing 18.

32 is the bolt for fixing the seats of the clack-valves in the casing 18.

The pump is double-acting. The steam-cylinder is controlled by the cylindrical slide-valve 5. The piston-rods of the steam-cylinder and of the pump-cylinder are connected to the same cross-head, which acts as a tappet to operate the steam-valve through the fork 13, as aforesaid.

The seat 27 of the suction clack-valves is mounted in the lower part of the casing 18, and the said seat carries in its upper part the clack-valve guides, which are integral with the said seat. The proper position of the seat 27 is insured by the guide 33, Fig. 6. The seat 29 of the outlet clack-valves is mounted in the upper part of the casing 18 and carries at its upper part the clack-valve guides, which are integral therewith. The lower part of the seat 29 serves as a guard for the suction clack-valves 28. The correct position of the seat 29 is also insured by a guide which engages with the notch 34, Fig. 9, and which is similar to the guide 33, Fig. 6. The cover 31 of the casing 18 carries at the lower part the guards (also marked 31) of the outlet clack-valves 30. The correct position of this cover is insured by a notch 35, Figs. 2 and 4, which bears against a similar notch of the cover of the other clack-valve casing 16. These various guides 33, 34, and 35 prevent the various parts being placed in incorrect positions, so that the guards take up their proper positions above their clack-valves. Instead of being fixed in a group the seats for the said clack-valves may be fixed independently. An arrangement of this kind is represented, by way of example, in Figs. 11 to 16. The form herein shown differs from that before described in that it is a horizontal pump and has a different form of valve.

The pump-cylinder 36 is fixed to the frame by its flange 37.

38 is a wall on which the seats of the suction-valves are mounted. Each seat 39 of the valves has formed integral therewith the guides (also marked 39) for the suction-valves. These seats are screwed into the wall 38 by means of a key which engages with notches 40, Figs. 13, 15, and 16.

41 represents the annular suction clacks or valves. They are guided externally by the guides formed on the upper parts of the seats 39.

42 represents the guards for the suction-valves, formed integral with a piece (also marked 42) screwed into the upper wall 43 of the pump by means of a key which engages with the recesses 44 of the guard-heads.

The projection 45, formed on the lower part of each guard, serves to prevent the corresponding seat of the clack-valve from rising should it become accidentally unscrewed.

The outlet clack-valves are arranged on the wall 46 of the pump in a manner analogous to that described with reference to the suction clack-valves.

The seats of the clack-valves are all alike, and their upper parts are bored internally to the same extent, so that the said valves are always properly guided and seat themselves accurately.

The bed-walls 38 and 43 are bored out in the same line and are screw-threaded alike.

The annular clack-valves thus arranged and guided according to my invention may be applied to pumps of any description. The said clack-valves may be fitted with springs, which at the proper moment return the clack-valves to their seats. An arrangement on this plan is shown in Fig. 16, wherein 47 is the spring, while the other reference-numerals indicate the same parts as those shown in Figs. 10 to 15.

The dimensions of the pump and also the dimensions and the number of clack-valves and their grouping and metal of which they are made may be varied according to requirement.

The pump operates as follows: The steam entering at 6 expands in the slide-valve box 4 and the cylindrical slide-valve 5 distributes it to the cylinder 1, from which, after acting on the piston, it exhausts through 7, the slide-valve being operated from the piston 2, through the cross-head 12, fork 13, and connecting-rod 14, and the piston 10 of the pump-cylinder 9 is driven directly by the piston of the steam-cylinder. The water enters, through the passage 20, the lower parts of the valve-boxes 16 and 18. The first stroke of the piston 10 causes the water to pass the clack-valves 28 and to enter the pump-cylinder 9. At the following reverse stroke of the piston the water so admitted is forced through the clack-valves 30 into the outlet or rising main 21. At the end of each stroke the flap-valve 22 or 24 opens the orifice 23 on the orifice 23', which places the suction and the discharge in communication, thereby affording an increase of the speed of the piston at the end of each of its strokes, which enables the reverse movement of the slide-valve 5 to be effected readily and quickly.

The advantages of the hereinbefore-described annular externally-guided clack-valves, in which the guides are integral with the seats, are that owing to the annular shape of the seats, affording a free passage for the water, the section for the passage of the water is considerably increased for the same lift of the clack-valves, and as the guides are integral with the seats and as they are bored out simultaneously with them the clack-valves are most accurately guided and the guides cannot get out of order. Further, as the guides for each clack-valve are outside thereof and of larger diameter than that of the seat, each of the clack-valves is always properly held in place along its axis and descends accurately upon its seat.

My invention may be applied to compressors and pumps for pumping fluids generally. I do not limit myself to the precise details shown in the drawings.

Having now particularly described and ascertained the nature of my said invention and in what manner the same is to be performed, I declare that what I claim is—

In pumping apparatus and compressors, the combination with a clack-valve casing of two plates supported therein one above the other and each provided with a series of annular passages each of which affords between its upper circumferential edges a valve-seat, an annular housing or guide surrounding each annular passage and formed integral with said plate, an annular valve located and working in each annular housing or guide and having its lower edge formed to fit accurately in the seat formed by said annular passage, a guard for said lower set of valves formed integral with and depending from said upper plate, a cover for said casing, a guard for said upper set of valves formed integral with and depending from said cover, and a central bolt passed through the seats and guides of the upper and lower valves for holding said plates securely in place in the casing, substantially as described.

In testimony whereof I have hereunto set my hand in presence of two subscribing witnesses.

LOUIS MARIE GABRIEL DELAUNAY-BELLEVILLE.

Witnesses:
ALFRED FREY,
EDWARD P. MACLEAN.